(12) United States Patent
Shuster (10) Patent No.: US 11,188,513 B2
(45) Date of Patent: Nov. 30, 2021

(54) LOGFILE COLLECTION AND CONSOLIDATION

(71) Applicant: Red Hat, Inc., Raleigh, NC (US)

(72) Inventor: Boaz Shuster, Kfar Saba (IL)

(73) Assignee: Red Hat, Inc., Raleigh, NC (US)

( * ) Notice: Subject to any disclaimer, the term of this patent is extended or adjusted under 35 U.S.C. 154(b) by 440 days.

(21) Appl. No.: 15/202,986

(22) Filed: Jul. 6, 2016

(65) Prior Publication Data

US 2018/0013612 A1 Jan. 11, 2018

(51) Int. Cl.
*G06F 16/23* (2019.01)
*G06F 16/182* (2019.01)
*G06F 16/18* (2019.01)
*H04L 12/26* (2006.01)

(52) U.S. Cl.
CPC ...... *G06F 16/2322* (2019.01); *G06F 16/1805* (2019.01); *G06F 16/2358* (2019.01); *G06F 16/182* (2019.01); *H04L 43/0817* (2013.01)

(58) Field of Classification Search
CPC ........... G06F 17/30353; G06F 16/2358; G06F 16/2322; G06F 16/0817; G06F 16/1805; G06F 16/182
USPC ........................................................ 707/633
See application file for complete search history.

(56) References Cited

U.S. PATENT DOCUMENTS

| 5,978,940 | A | * | 11/1999 | Newman | H04Q 3/0087 714/712 |
| 5,987,633 | A | * | 11/1999 | Newman | H04L 43/50 379/10.03 |
| 6,374,296 | B1 | * | 4/2002 | Lim | G07C 9/257 709/225 |
| 6,789,156 | B1 | * | 9/2004 | Waldspurger | G06F 12/1018 711/6 |
| 7,209,898 | B2 | * | 4/2007 | Pfeiffer | G06F 11/3006 705/51 |
| 7,653,836 | B1 | * | 1/2010 | Chatterjee | G06F 11/1076 714/20 |
| 8,464,335 | B1 | * | 6/2013 | Sinha | G06F 21/51 726/13 |
| 9,736,243 | B2 | * | 8/2017 | Chablani | G06F 3/0653 |
| 9,959,489 | B2 | * | 5/2018 | Yamamoto | H04L 67/10 |
| 10,142,195 | B1 | * | 11/2018 | Sledz | G06F 16/182 |
| 10,181,991 | B1 | * | 1/2019 | Mathews | H04L 41/0672 |
| 10,387,370 | B2 | * | 8/2019 | Shuster | G06F 16/148 |
| 2003/0009486 | A1 | * | 1/2003 | Shimada | G06F 3/0608 |
| 2003/0105811 | A1 | * | 6/2003 | Laborde | G06F 16/256 709/203 |
| 2003/0135507 | A1 | * | 7/2003 | Hind | G06F 21/31 |
| 2004/0078722 | A1 | * | 4/2004 | Pfeiffer | G06F 11/3086 714/47.2 |
| 2005/0235058 | A1 | * | 10/2005 | Rackus | H04L 43/00 709/224 |

(Continued)

*Primary Examiner* — Belix M Ortiz Ditren
*Assistant Examiner* — Nargis Sultana
(74) *Attorney, Agent, or Firm* — Withrow & Terranova, PLLC (57) ABSTRACT

Mechanisms for consolidating log information from remote computing devices are provided. Connections with a plurality of remote computing devices are established. Each remote computing device has a corresponding logfile. For a plurality of iterations, logfile contents from each logfile on each remote computing device are retrieved, and the logfile contents are sent to a centralized monitoring service.

20 Claims, 6 Drawing Sheets

(56) References Cited

U.S. PATENT DOCUMENTS

| | | | |
|---|---|---|---|
| 2005/0273667 A1* | 12/2005 | Shrivastava | G06F 11/0748 714/47.2 |
| 2006/0106851 A1* | 5/2006 | Warshawsky | G06F 16/2358 |
| 2007/0050777 A1* | 3/2007 | Hutchinson | G06F 11/0781 718/104 |
| 2007/0100991 A1* | 5/2007 | Daniels | H04L 51/34 709/224 |
| 2009/0013149 A1* | 1/2009 | Uhlig | G06F 12/1036 711/207 |
| 2009/0138703 A1* | 5/2009 | Schneider | H04L 63/0442 713/155 |
| 2009/0313503 A1* | 12/2009 | Atluri | G06F 11/1453 714/19 |
| 2011/0153616 A1* | 6/2011 | Torres | G06F 11/3664 707/741 |
| 2011/0208663 A1* | 8/2011 | Kennis | G06Q 10/10 705/317 |
| 2011/0276695 A1* | 11/2011 | Maldaner | H04L 41/00 709/226 |
| 2012/0017028 A1* | 1/2012 | Tsirkin | G06F 12/10 711/6 |
| 2012/0216007 A1* | 8/2012 | Tsirkin | G06F 11/2056 711/173 |
| 2013/0227352 A1* | 8/2013 | Kumarasamy | G06F 11/1461 714/47.1 |
| 2013/0332424 A1* | 12/2013 | Nos | G06F 16/1734 707/687 |
| 2014/0040180 A1* | 2/2014 | Ruhl | G06F 16/958 706/52 |
| 2014/0058801 A1* | 2/2014 | Deodhar | G06Q 10/0639 705/7.38 |
| 2014/0181461 A1* | 6/2014 | Kegel | G06F 12/1027 711/207 |
| 2014/0279920 A1* | 9/2014 | Madhavarapu | G06F 16/2358 |
| 2014/0282031 A1* | 9/2014 | Hinterbichler | G06F 11/3656 715/738 |
| 2015/0220605 A1* | 8/2015 | Syed | G06F 17/40 707/776 |
| 2015/0256423 A1* | 9/2015 | Stearns | H04L 43/045 709/224 |
| 2015/0269183 A1* | 9/2015 | Avati | G06F 16/2358 707/634 |
| 2015/0269213 A1* | 9/2015 | Avati | G06F 16/2358 707/693 |
| 2015/0286663 A1* | 10/2015 | Mangan, III | G06Q 10/063 707/722 |
| 2015/0324297 A1* | 11/2015 | Tati | G06F 9/45558 711/6 |
| 2016/0041976 A1* | 2/2016 | Pradeep | G06F 16/2358 707/695 |
| 2016/0275128 A1* | 9/2016 | Dayka | G06F 16/2365 |
| 2016/0292263 A1* | 10/2016 | Ferrar | G06F 11/3072 |
| 2016/0299934 A1* | 10/2016 | Karandikar | G06F 16/248 |
| 2017/0075922 A1* | 3/2017 | Torman | G06F 16/2358 |
| 2017/0104820 A1* | 4/2017 | Golander | H04L 67/1097 |
| 2017/0331880 A1* | 11/2017 | Crofton | H04L 67/2804 |

* cited by examiner

LOGFILE COLLECTION AND CONSOLIDATION

TECHNICAL FIELD

The examples relate to logfiles and, in particular, to logfile collection and consolidation.

BACKGROUND

Computing devices often record events and status information periodically or intermittently that may be subsequently analyzed to glean valuable information. For example, a web server may record each connection made to a website that is hosted on the web server. This connection information may be subsequently analyzed to determine how many connections each website hosted by the web server received over a period of time. Computing devices often record such information in one or more structures referred to as logfiles. In practice, multiple computing devices are often concurrently generating logfiles. For example, an entity may have hundreds of web servers that concurrently host thousands of websites.

SUMMARY

The examples provide mechanisms for logfile collection and consolidation. The examples implement a mechanism by which a plurality of logfiles maintained on a corresponding plurality of remote computing devices can be securely and iteratively consolidated on a remote monitoring service by a single computing device on an ongoing basis.

In one example, a method for consolidating log information from remote computing devices is provided. The method includes establishing, by a computing device comprising a processor device via a network, connections with a plurality of remote computing devices, each remote computing device having a corresponding logfile. The method further includes, for a plurality of iterations, retrieving logfile contents from each logfile on each remote computing device, and sending the logfile contents to a centralized monitoring service.

In one example, for the plurality of iterations, retrieving the logfile contents from each logfile on each remote computing device includes, for each remote computing device, accessing logfile meta data that identifies attributes of the corresponding logfile and determining from the logfile meta data that the logfile has a new logfile status or an old logfile status. If the logfile has the new logfile status, all the logfile contents of the logfile are retrieved. If the logfile has the old logfile status, only the logfile contents of the logfile that have been added to the logfile since the logfile was previously accessed are retrieved.

In one example, the logfile meta data comprises inode data. In one example, for each logfile, a first inode identifier that identifies an inode at a time T1 that refers to the respective logfile is stored. A second inode value that identifies the inode at a time T2 that refers to the respective logfile is determined. Responsive to determining that the second inode value is different from the first inode value, the logfile is determined to have the new logfile status.

In another example, a computing device is provided. The computing device includes a memory and a processor device coupled to the memory. Connections with a plurality of remote computing devices are established. Each remote computing device has a corresponding logfile. For a plurality of iterations, logfile contents from each logfile on each remote computing device are retrieved, and the logfile contents are sent to a centralized monitoring service.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first inode identifier" and "second inode identifier," and does not imply a priority, a type, an importance, or other attribute, unless otherwise stated herein.

As used herein and in the claims, the articles "a" and "an" in reference to an element refers to "one or more" of the element unless otherwise explicitly specified.

Computing devices often record events and status information periodically or intermittently that may be subsequently analyzed to glean valuable information. For example, a web server may record each connection made to a website that is hosted on the web server. This connection information may be subsequently analyzed to determine how many connections each website hosted by the web server received over a period of time. Computing devices often record such information in one or more structures referred to as logfiles. In practice, multiple computing devices are often concurrently generating logfiles. For example, an entity may have hundreds of web servers that concurrently host thousands of websites.

A centralized monitoring service that runs on a monitoring computing device that is different from the computing devices that generate the logfiles is often used to analyze logfiles. The centralized monitoring service typically provides specialized functionality associated with the analysis of logfiles, such as an ability to index key words, build suitable searching structures, and the like. The centralized monitoring service may also offer a user interface that allows an operator or other user to query or otherwise access the logfile contents to glean the desired information.

In order to analyze logfile contents, the logfile contents are first copied from the remote computing devices to the centralized monitoring service. Because the logfile contents in the logfiles are typically generated continually, and because hundreds or even thousands of remote computing devices may be generating logfiles, the logistics of continually moving the logfiles from the remote computing devices to the centralized monitoring service can be time-consuming, or impracticable.

The examples herein establish connections with a plurality of different remote computing devices, each of which has a corresponding logfile. For a plurality of iterations, logfile contents from each logfile on each remote computing device are retrieved, and the logfile contents are sent to a centralized monitoring service. Among other advantages, the examples eliminate a need to manually and repeatedly copy logfiles from multiple different devices to a centralized location, furthermore, the examples only copy logfile contents that have been added since the previous iteration.

Figure 1:
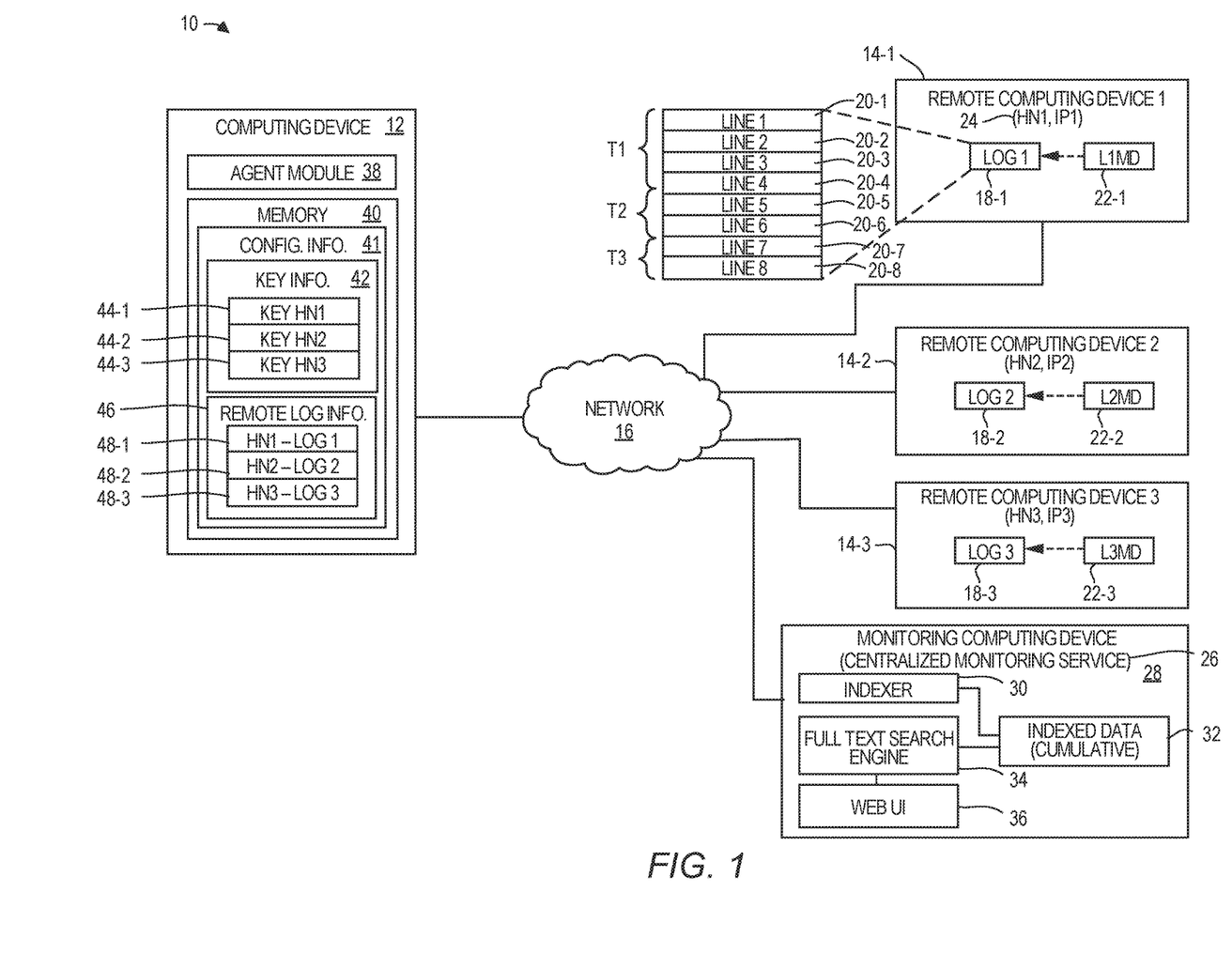
FIG. 1 is a block diagram of a system in which examples may be practiced.

FIG. 1 is a block diagram of a system 10 in which examples may be practiced. The system 10 includes a computing device 12 and a plurality of remote computing devices 14-1-14-3 (generally, remote computing devices 14). The phrase "remote" in this context is used solely to differentiate the remote computing devices 14 from the computing device 12, and does not imply a geographic distance or other characteristic or attribute. The remote computing devices 14 could be located in a same building or structure as the computing device 12, or could be located thousands of miles away from the computing device 12. Each remote computing device 14 may be located geographically distant from each other remote computing device 14, or the remote computing devices 14 may be located in relatively close proximity to one another. The computing device 12 communicates with the remote computing devices 14 via one or more networks 16.

The remote computing device 14-1 contains a logfile 18-1. The logfile 18-1 may contain any data that may be periodically and/or intermittently recorded by the remote computing device 14-1. The data may comprise operational aspects of the remote computing device 14-1, such as memory utilization, disk storage utilization, processor utilization, or the like, at a particular instance in time. The data may also comprise events that occur on the remote computing device 14-1, such as detected faults, security breaches, and the like. The nature of the logfile 18-1 may depend on the nature of the application that generates the logfile 18-1. A web server, for example, may record information relating to each request or connection made to a website hosted by the web server. The particular information that is recorded can comprise any desired information, such as which website received the request, the time of the request, the IP address from which the request originated, and the like. By way of non-limiting example, the information recorded in the logfile 18-1 may comprise requests processed by a server, diagnostic information identifying errors encountered in processing requests; data identifying when a processing task was executed, a name of the processing task, and if the processing task failed or was successful; messages from an operating system kernel that identify problems during the execution of the kernel; and warning or error messages generated by an executing task. The information contained in the logfile 18-1 and other logfiles discussed herein may be referred to as the logfile contents.

In this example the logfile contents comprise a plurality of lines 20-1-20-8 (generally, lines 20). Each line 20 represents a recorded, or logged, record of information. As discussed above, the information may comprise any information that the remote computing device 14-1 is configured to record. The lines 20 are recorded iteratively over time, and thus the logfile 18-1 grows over time. In some environments, after the logfile 18-1 reaches a predetermined size, the logfile 18-1 is automatically closed, renamed, and a new, empty logfile 18-1 is created to prevent a logfile 18-1 from growing beyond a certain size.

The remote computing device 14-1 also includes logfile meta data 22-1 that identifies attributes of the corresponding logfile 18-1, including the locations of the blocks of data that compose the logfile 18-1. The precise content of the logfile meta data 22-1 may differ depending on environmental aspects of the remote computing device 14-1. For example, if the operating system environment of the remote computing device 14-1 is a Unix or Linux operating system, the logfile meta data 22-1 may comprise an inode. The inode data may include, by way of non-limiting example, an inode number that uniquely identifies the respective inode from other inodes, an Access Control List (ACL), extended attributes, pointers to direct/indirect disk blocks, number of blocks, file access time, file creation time, last modification timestamp, file deletion time, file generation number, file size, file type, group, number of links, owner, permissions, and status flags. In other operating environments, such as the Microsoft Windows operating system and the Apple OSX operating system, the logfile meta data 22-1 may have a different format, but generally comprises substantially similar information as discussed herein with regard to the Unix or Linux operating systems.

The remote computing device 14-1 may be addressable by the computing device 12 for purposes of communication via address information 24, which may include, by way of non-limiting example, a hostname, an IP address, or any other identifier via which the computing device 12 may initiate communications with the remote computing device 14-1 via the network 16.

The remote computing device 14-2 similarly contains a logfile 18-2, and logfile meta data 22-2 that identifies attributes of the corresponding logfile 18-2, including the locations of the blocks of data that compose the logfile 18-2. Substantially the same events or environmental information may be logged to the logfile 18-2 as logged to the logfile 18-1. For example, in the example of a web server, the logfile 18-2 may contain a record of information that identifies each request or connection made to a website hosted by the remote computing device 14-2.

The remote computing device 14-3 similarly contains a logfile 18-3, and logfile meta data 22-3 that identifies attributes of the corresponding logfile 18-3, including the locations of the blocks of data that compose the logfile 18-3. Substantially the same events or environmental information may be logged to the logfile 18-3 as logged to the logfiles 18-1, 18-2. For example, in the example of a web server, the logfile 18-3 may contain a record of information that identifies each request or connection made to a website hosted by the remote computing device 14-3.

While for purposes of illustration only three remote computing devices 14 are illustrated, the examples are not limited to any particular number of remote computing devices 14, and have applicability to hundreds or thousands of remote computing devices 14. Similarly, while for purposes of illustration only, each remote computing device 14 contains only a single logfile 18, in practice a remote computing device 14 may concurrently maintain any number of logfiles 18.

The system 10 includes a centralized monitoring service 26 that is implemented on a monitoring computing device 28. As will be discussed in greater detail herein, the logfile contents of the logfiles 18 are periodically provided to the centralized monitoring service 26. The centralized monitoring service 26 includes an indexer module 30 that receives the logfile contents of the logfiles 18, and generates indexed data 32 based on the logfile contents. A full text search engine 34 can search the indexed data 32 in response to queries received from a user who interfaces with the full text search engine 34 via a web user interface 36.

The computing device 12 includes an agent module 38 that, as discussed in greater detail herein, iteratively and securely collects the logfile contents of the logfiles 18 from the remote computing devices 14, and sends the logfile contents to the centralized monitoring service 26. Because the agent module 38 executes on the computing device 12, functionality implemented by the agent module 38 may be attributed to the computing device 12 throughout the specification and claims herein. The computing device 12 includes a memory 40 that includes configuration information 41 suitable for implementing aspects of the examples. The configuration information 41 may be configured by an operator and maintained in a persistent storage device, and subsequently read or otherwise loaded into the memory 40 by the agent module 38 or other process.

In some examples, the configuration information 41 includes digital key information 42 for facilitating secure connections between the computing device 12 and the remote computing devices 14. The digital key information 42 comprises a plurality of digital keys 44-1-44-3, each of which comprises a public key associated with a corresponding remote computing device 14. In particular, the digital key 44-1 is associated with the remote computing device 14-1, the digital key 44-2 is associated with the remote computing device 14-2, and the digital key 44-3 is associated with the remote computing device 14-3. The digital key information 42 may be used to establish secure connections, such as, by way of non-limiting example, secure shell (SSH) connections, but the examples are not limited to any particular type of secure connections. Such secure connections result in communications between the computing device 12 and the remote computing devices 14 being encrypted. Encrypted communications prevent access to the log contents of the logfiles 18-1-18-3 by any unintended or inadvertent recipients as the log contents of the logfiles 18-1-18-3 are communicated from the remote computing devices 14 to the computing device 12 as discussed in greater detail below.

The configuration information 41 also includes remote log information 46. The remote log information 46 includes logfile location records 48-1-48-3, each of which identifies a logfile to be consolidated, and the location of the respective logfile. The logfile location record 48-1 identifies the logfile 18-1 and provides the hostname of the remote computing device 14-1 so that secure communications between the computing device 12 and the remote computing device 14-1 can be established. The logfile location record 48-2 identifies the logfile 18-2 and provides the hostname of the remote computing device 14-2. The logfile location record 48-3 identifies the logfile 18-3 and provides the hostname of the remote computing device 14-3.

Figure 2:
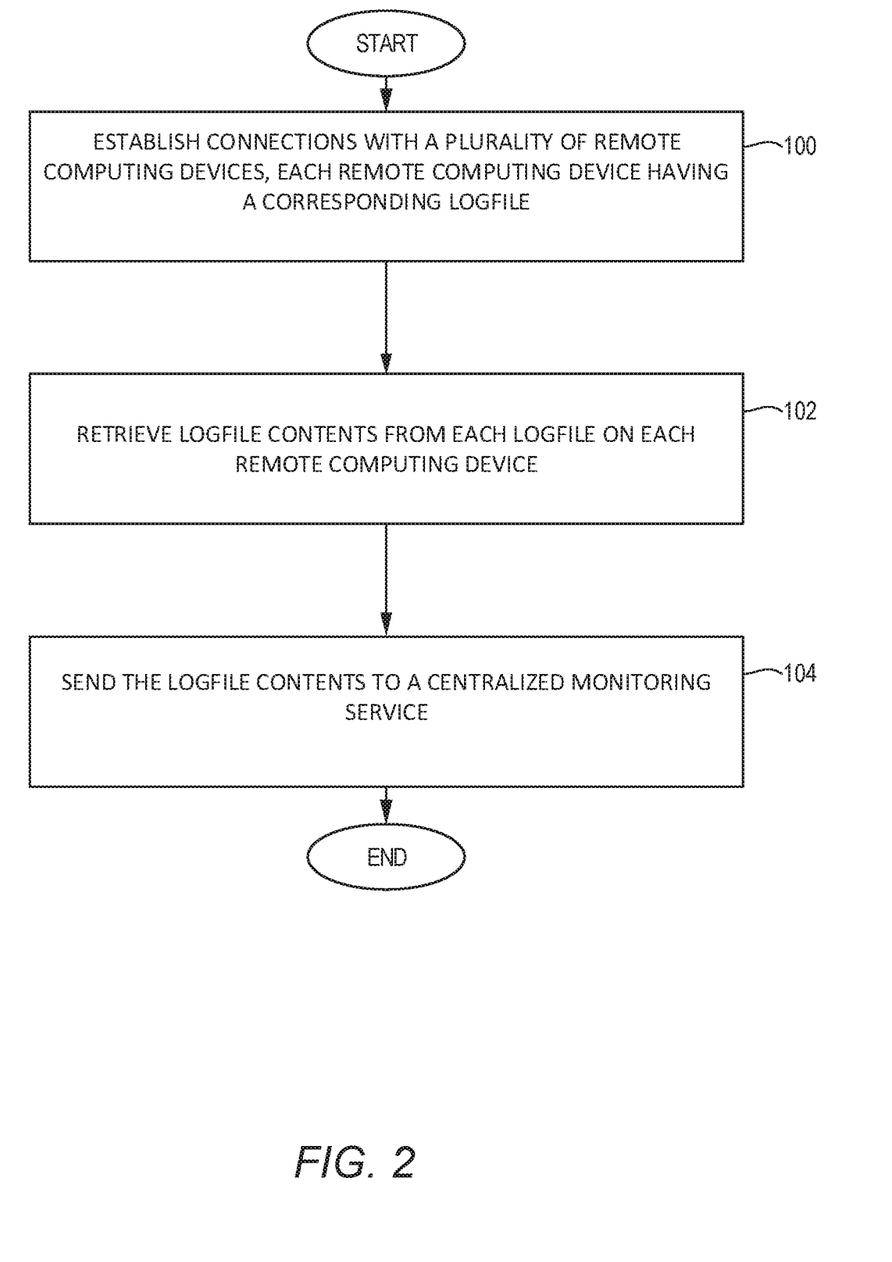
FIG. 2 is a flowchart of a method for consolidating log information from remote computing devices according to one example.

FIG. 2 is a flowchart of a method for consolidating log information from the remote computing devices 14 according to one example. FIG. 2 will be discussed in conjunction with FIG. 1. The computing device 12 establishes secure connections with the remote computing devices 14-1 (block 100). In one example, the secure connections comprise SSH connections. The computing device 12 then retrieves the logfile contents from each logfile 18 on each remote computing device 14 (block 102). Mechanisms for retrieving the logfile contents are discussed in greater detail below with regard to FIGS. 3 and 4. The computing device 12 then sends the logfile contents to the centralized monitoring service 26 (block 104). The process described in blocks 102 and 104 may be iteratively performed over a desired period of time, or may continue indefinitely. The iterations may be performed in response to a signal received from another module, in response to a determination that logfile contents have been added to a logfile 18, or at a desired periodic interval, such as multiple times a second, each second, each desired number of seconds, each minute, or each desired number of minutes.

Figure 3:
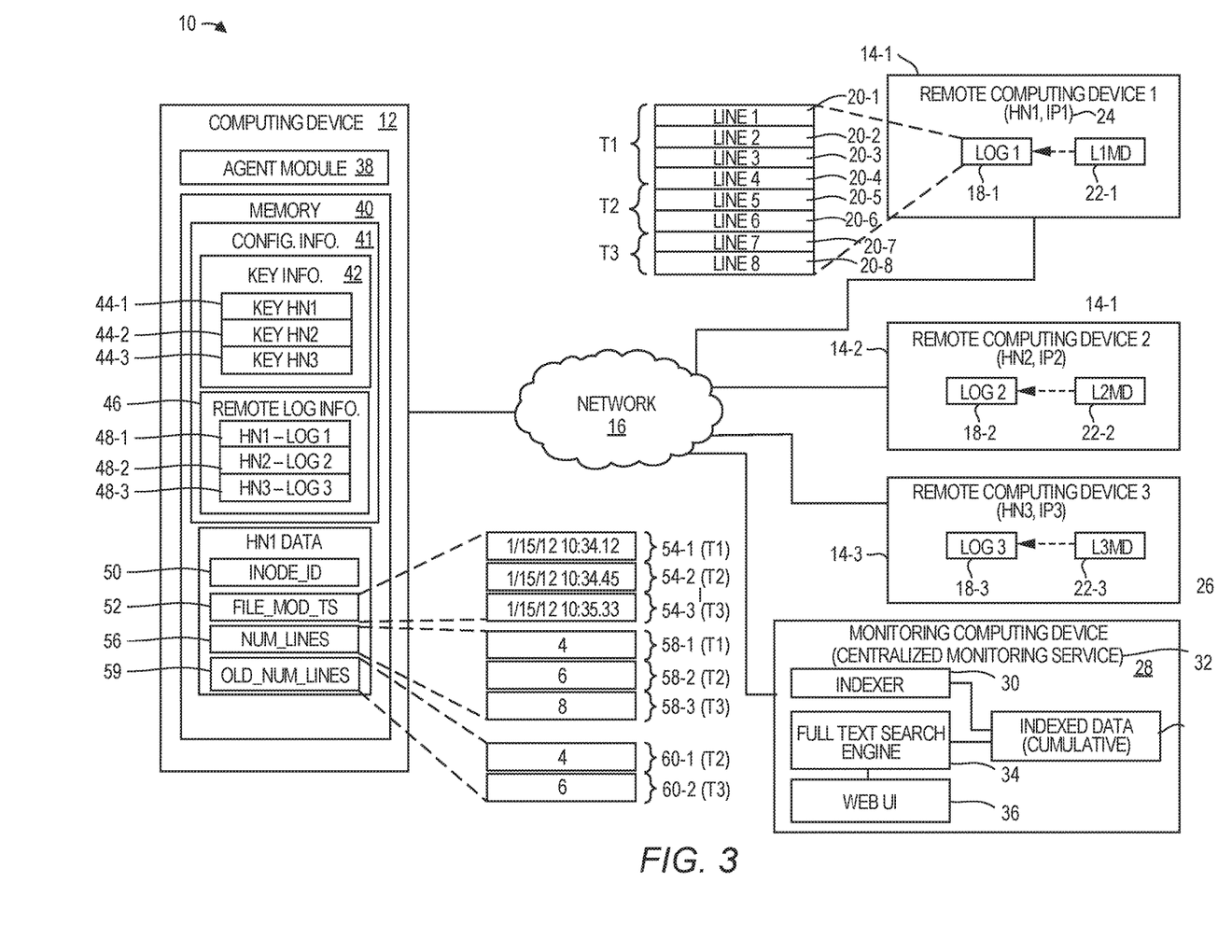
FIG. 3 is a block diagram of the system illustrated in FIG. 1 that illustrates aspects of a method for consolidating log information from remote computing devices in greater detail.
Figure 4:
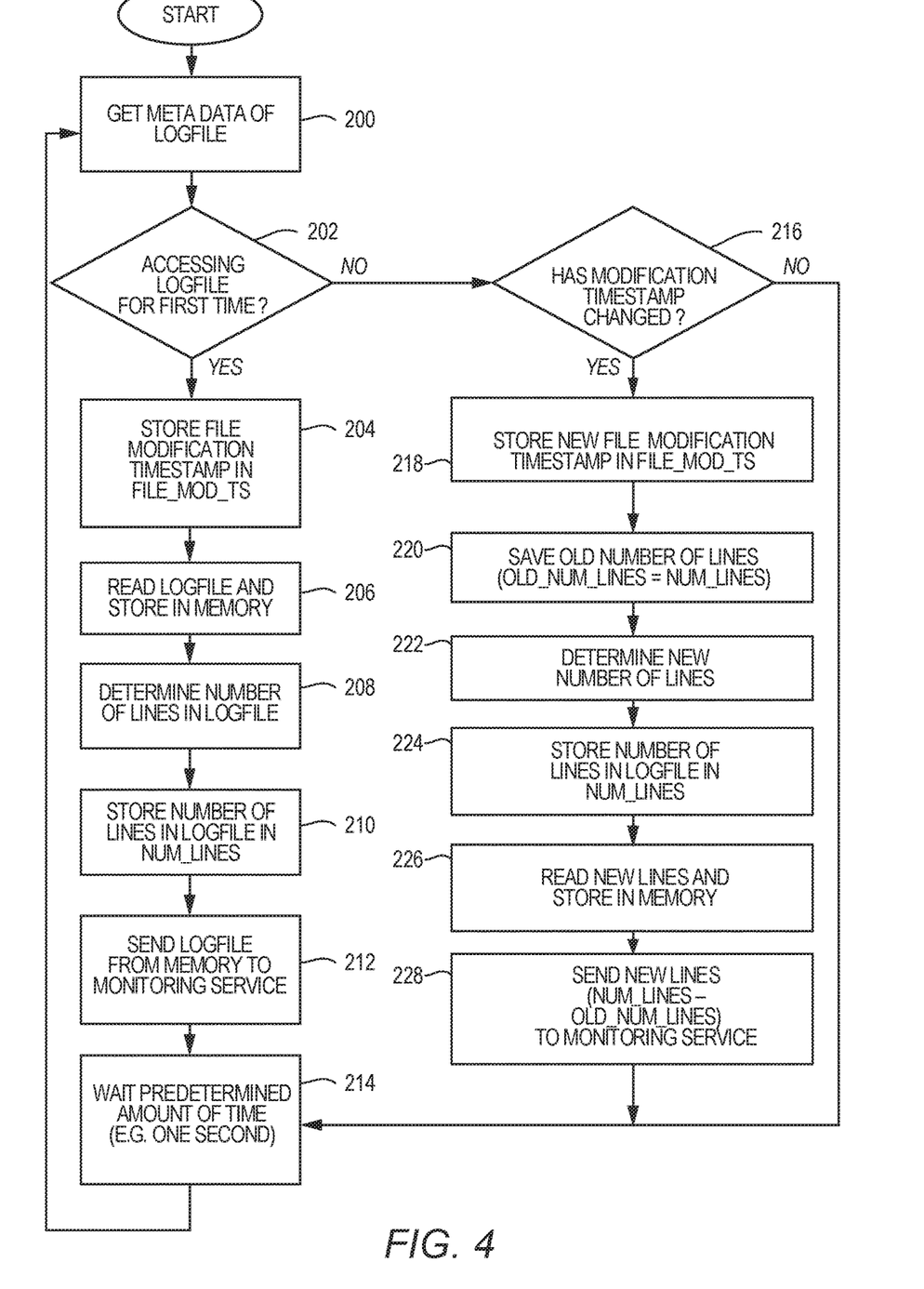
FIG. 4 is a more detailed flowchart of the method for consolidating log information from the remote computing devices illustrated in FIG. 2.

FIG. 3 is a block diagram of the system 10 illustrated in FIG. 1 that illustrates aspects of a method for consolidating log information from the remote computing devices 14 in greater detail. FIG. 4 is a more detailed flowchart of the method for consolidating log information from the remote computing devices 14 as illustrated in FIG. 2. FIGS. 3 and 4 will be discussed in conjunction with one another. Referring first to FIG. 4, for purposes of clarity and illustration, the method for consolidating log information will be described in detail with respect to a single logfile 18-1 of the remote computing device 14-1. However, in operation, the same method would be utilized for each logfile 18. In some examples, the agent module 38 may initiate a separate process, or thread, for each individual logfile 18, such that the method described herein is performed in parallel for each logfile 18.

Assume that the computing device 12 has established an SSH connection with the remote computing device 14-1, as discussed above with regard to block 100 in FIG. 2. At a time period beginning at T1 the computing device 12 obtains logfile meta data 22-1 associated with the logfile 18-1 (block 200) to determine, among other things, a status of the logfile 18-1. If the logfile 18-1 has not been previously accessed, the logfile 18-1 has a new logfile status. If the logfile 18-1 has been previously accessed, the logfile 18-1 has an old logfile status. In one example, the logfile meta data 22-1 comprises an inode that contains inode data. To obtain the inode data, the computing device 12 may execute a command via the SSH connection on the remote computing device 14-1. In one example, the command may comprise the "stat" command. In response to the issuance of the "stat" command, the remote computing device 14-1 provides the inode data to the computing device 12. The inode data includes information such as the unique inode identifier that uniquely identifies the inode, and the most recent modification timestamp associated with the logfile 18-1. Based on the inode data, the computing device 12 determines whether the logfile 18-1 is being accessed for the first time (block 202). In particular, in one example, the computing device 12 maintains a memory location 50 in which the inode identifier of the inode is stored each time the inode data is obtained. Because the memory location 50 upon initialization contains no value, the computing device 12 determines that this is the first time the logfile 18-1 has been accessed. The computing device 12 stores the inode identifier from the inode data in the memory location 50.

The computing device 12 obtains the most recent modification timestamp of the logfile 18-1 from the inode data and stores the most recent modification timestamp in a memory location 52 (block 204). Assume for purposes of illustration that the modification timestamp at the time T1 has a modification timestamp value 54-1. The computing device 12 reads the entire logfile 18-1 from the remote computing device 14-1 and stores the logfile in the memory 40 (block 206). In one example, the computing device 12 may read the logfile 18-1 by executing a "cat" command via the SSH connection on the remote computing device 14-1.

The computing device determines the current total number of lines 20 of the logfile 18-1 (block 208). For purposes of illustration, assume that at time T1, the logfile 18-1 contains the four lines 20-1-20-4. The current total number of lines can be determined in any desired manner. In one example, the Python™ language may be used to implement some of the functionality disclosed herein, and the Python™ "len" function may be used to determine the current total number of lines 20-1-20-4. The computing device 12 stores the current total number of lines 20-1-20-4 in a memory location 56 (block 210). Thus, the memory location 56 has a value 58-1. The computing device 12 sends the lines 20-1-20-4 to the centralized monitoring service 26 (block 212). The computing device 12 may send the lines 20-1-20-4 to the centralized monitoring service 26 in any desired manner. In one example, the computing device 12 may use the Secure Sockets Layer (SSL) to establish an encrypted link between the computing device 12 and the centralized monitoring service 26. The first iteration is now complete.

While for purposes of illustration the centralized monitoring service 26 is shown as being implemented on a monitoring computing device 28 that is separate from the computing device 12, in other examples, the centralized monitoring service 26 may be a component of the computing device 12, and the computing device 12 sends the lines 20-1-20-4 to the centralized monitoring service 26 via, for example, an interprocess communication mechanism, such as an application programming interface, a port, or the like, or by storing the lines 20-1-20-4 in a storage device to which the centralized monitoring service 26 has access.

The computing device 12 waits a predetermined amount of time (block 214). As discussed above, the predetermined amount of time may be any desired time interval. After the predetermined amount of time lapses, at a time period beginning at time T2 the computing device 12 begins the process again and obtains the logfile meta data 22-1 associated with the logfile 18-1 (block 200). The computing device 12 obtains the inode identifier from the inode data and compares the inode identifier to the previously stored inode identifier stored in the memory location 50 to determine if the logfile 18-1 is being accessed for the first time (block 202). If the current inode identifier differs from the previously stored inode identifier, the logfile 18-1 is a new logfile, and the logfile 18-1 has the new logfile status. This may occur, for example, if the logfile 18-1 was rotated and a new logfile 18-1 created since the computing device 12 last accessed the inode data. If the logifle 18-1 is a new logfile, the process described above with regard to blocks 204-214 is repeated.

Assume for purposes of illustration that the current inode identifier matches the inode identifier stored in the memory location 50. If the current inode identifier matches the inode identifier stored in the memory location 50, the logfile 18-1 is not being accessed for the first time, and the logfile 18-1 has the old logfile status. The computing device 12 then extracts the most recent modification timestamp from the inode data and compares the most recent modification timestamp with the previous modification timestamp stored in the memory location 52 (block 216). If the most recent modification timestamp and the previous modification timestamp have not changed, then no additional lines 20 have been added to the logfile 18-1 since the previous iteration, and the process returns to block 214 to wait for the next iteration.

For purposes of illustration, assume that since the last iteration and prior to the time period beginning at time T2 the remote computing device 14-1 recorded, or logged, the additional lines 20-5-20-6 to the logfile 18-1. This modification of the logfile 18-1 alters the modification timestamp in the inode data and thus, at block 216, the computing device 12 determines that the modification timestamp in the inode data differs from the modification timestamp stored in the memory location 52. The computing device 12 stores the new modification timestamp in the memory location 52, and the memory location 52 now has the modification timestamp value 54-2 (block 218). The computing device 12 copies the number of previous lines 20 stored in the memory location 56 to a memory location 59 (block 220). The memory location 59 has the value 60-1.

The computing device 12 determines the new current total number of lines 20-1-20-6 in the logfile 18-1 (block 222), and stores the new current total number of lines 20-1-20-6 in the memory location 56 (block 224). The memory location 56 has a value 58-2. The computing device 12 determines the number of new lines 20-5-20-6 based on the current total number of lines 20-1-20-6 and the previous total number of lines 20-1-20-4. In this example, the number of new lines 20-5-20-6 is two. The computing device 12 reads the number of new lines 20-5-20-6 from the remote computing device 14-1 and stores the new lines 20-5-20-6 in the memory 40 (block 226). The computing device 12 sends the lines 20-5-20-6 to the centralized monitoring service 26 (block 228). This completes the second iteration.

The computing device 12 waits a predetermined amount of time (block 214). After the predetermined amount of time lapses, at a time period beginning at time T3, the computing device 12 begins the process again and obtains the logfile meta data 22-1 associated with the logfile 18-1 (block 200). The computing device 12 obtains the inode identifier from the inode data and compares the inode identifier to the previously stored inode identifier stored in the memory location 50 to determine if the logfile 18-1 is being accessed for the first time (block 202). Assume for purposes of illustration that the current inode identifier matches the inode identifier stored in the memory location 50. If the current inode identifier matches the inode identifier stored in the memory location 50, the logfile 18-1 is not being accessed for the first time. The computing device 12 then extracts the most recent modification timestamp from the inode data and compares the most recent modification timestamp with the previous modification timestamp stored in the memory location 52 (block 216). For purposes of illustration, assume that since the last iteration and prior to the time T3 the remote computing device 14-1 recorded, or logged, the additional lines 20-7-20-8 to the logfile 18-1. This modification of the logfile 18-1 alters the modification timestamp in the inode data and thus, at block 216, the computing device 12 determines that the modification timestamp in the inode data differs from the modification timestamp stored in the memory location 52. The computing device 12 stores the new modification timestamp in the memory location 52, and the memory location 52 now has the modification timestamp value 54-3 (block 218). The computing device 12 copies the number of previous lines 20 stored in the memory location 56 to a memory location 59 (block 220). The memory location 59 has the value 60-2.

The computing device 12 determines the new current total number of lines 20-1-20-8 in the logfile 18-1 (block 222), and stores the new current total number of lines in the memory location 56 (block 224). The memory location 56 has a value 58-3. The computing device 12 determines the number of new lines 20-7-20-8 based on the current total number of lines 20-1-20-8 and the previous total number of lines 20-1-20-6. In this example, the number of new lines 20-7-20-8 is two. The computing device 12 reads the number of new lines 20-7-20-8 from the remote computing device 14-1 and stores the new lines 20-7-20-8 in the memory 40 (block 226). The computing device 12 sends the lines 20-7-20-8 to the centralized monitoring service 26 (block 228). This completes the third iteration.

This process may continue indefinitely, and may be performed for the remote computing device 14-2-14-2 consecutively, or in parallel with the remote computing device 14-1. In this manner, the computing device 12 securely consolidates the logfile contents of the logfiles 18-1-18-3 on a continuous basis from the remote computing devices 14-1-14-3 to the centralized monitoring service 26.

While for purposes of illustration the process has been described in terms of a number of lines of a logfile 18, the examples are not limited to using a number of lines of the logfile 18, and can utilize any mechanism by which additional content that has been added to the logfile 18 since the last iteration can be determined. For example, in some examples the computing device 12 may utilize a size of the logfile 18, and copy all logfile content that has been added to a logfile 18 since the previous iteration based on an increase in size of the logfile 18. For example, at each iteration the computing device 12 may determine and store a total size of the logfile 18 in the memory 40. At the successive iteration, the computing device 12 may retrieve the previous size of the logfile 18 from the memory 40, determine a current size of the logfile 18, determine a new amount of data based on the previous size and the current size, and retrieve a most recent amount of data added to the logfile 18 equal to the new amount of data.

For example, during one iteration a logfile 18 may be 434 kB in size. At a next iteration, the logfile 18 may have grown to 437 kB in size, and the computing device 12 may read the last 3 kB of data from the logfile 18 and send the data to the centralized monitoring service 26.

Figure 5:
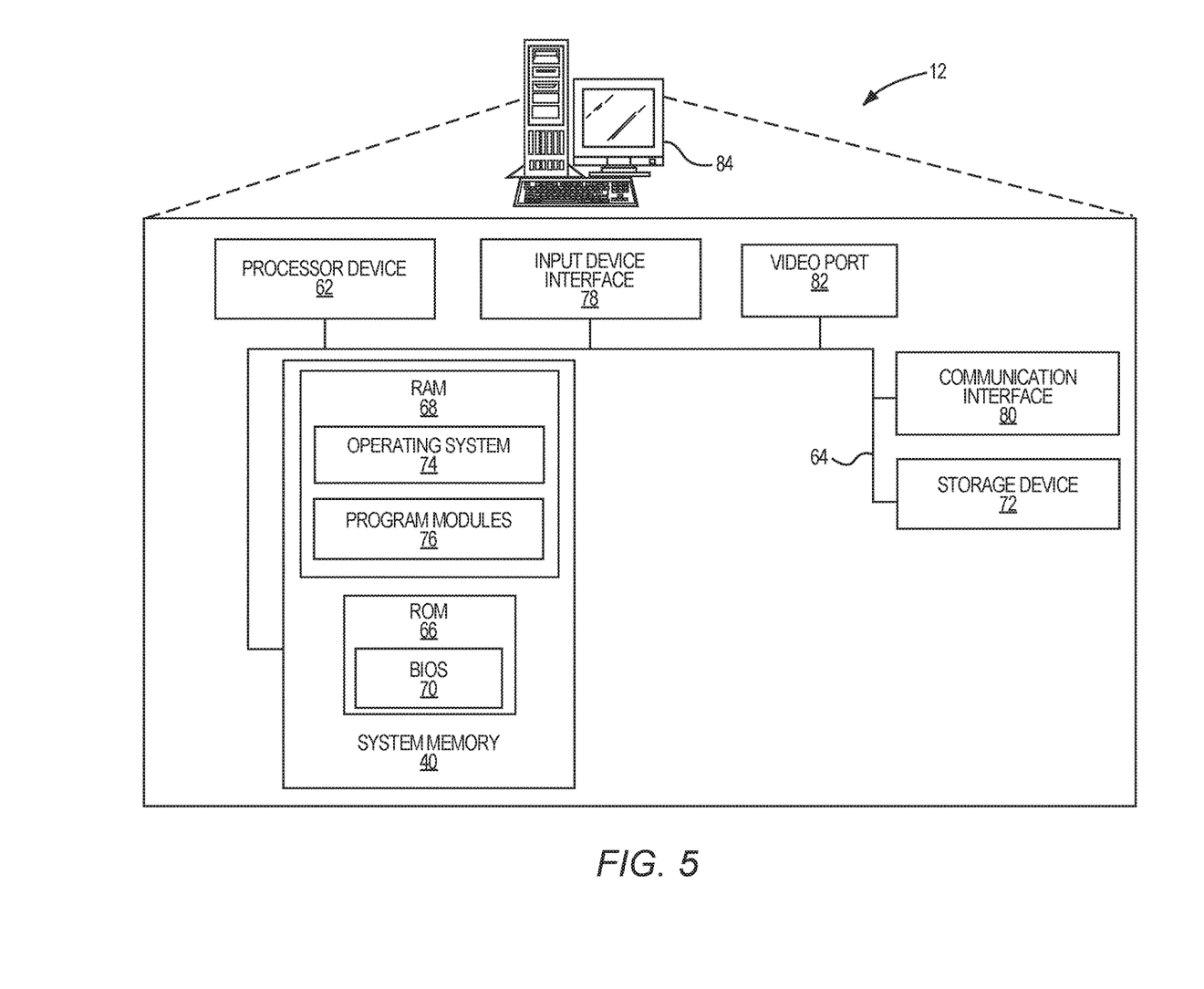
FIG. 5 is a block diagram of a computing device according to one example.

FIG. 5 is a block diagram of the computing device 12 suitable for implementing examples according to one example. The computing device 12 may comprise any computing or electronic device capable of including firmware, hardware, and/or executing software instructions to implement the functionality described herein, such as a computer server device, a desktop computing device, or the like. The computing device 12 includes a processor device 62, the system memory 40, and a system bus 64. The system bus 64 provides an interface for system components including, but not limited to, the system memory 40 and the processor device 62. The processor device 62 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 40 may include non-volatile memory 66 (e.g., read-only memory (ROM), erasable programmable read-only memory (EPROM), electrically erasable programmable read-only memory (EEPROM), etc.), and/or volatile memory 68 (e.g., random-access memory (RAM)). A basic input/output system (BIOS) 70 may be stored in the non-volatile memory 66 and can include the basic routines that help to transfer information between elements within the computing device 12. The volatile memory 68 may also include a high-speed RAM, such as static RAM, for caching data.

The computing device 12 may further include or be coupled to a non-transitory computer-readable storage medium or storage device 72, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 72 and other drives associated with computer-readable media and computer-usable media may provide non-volatile storage of data, data structures, computer-executable instructions, and the like, including, for example, the configuration information 41. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 72 and in the volatile memory 68, including an operating system 74 and one or more program modules 76, which may implement the functionality described herein in whole or in part, including, for example, the functionality described herein with regard to the agent module 38. It is to be appreciated that the examples can be implemented with various commercially available operating systems 74.

All or a portion of the examples may be implemented as a computer program product stored on a transitory or non-transitory computer-usable or computer-readable storage medium, such as the storage device 72, which includes complex programming instructions, such as complex computer-readable program code, configured to cause the processor device 62 to carry out the steps described herein. Thus, the computer-readable program code can comprise software instructions for implementing the functionality of the examples described herein when executed on the processor device 62. The processor device 62, in conjunction with the program modules 76 in the volatile memory 68, may serve as a controller, or control system, for the computing device 12 that is configured to, or adapted to, implement the functionality described herein.

An operator or other user may also be able to enter one or more configuration commands through a keyboard (not illustrated), a pointing device such as a mouse (not illustrated), or a touch-sensitive surface (not illustrated). Such input devices may be connected to the processor device 62 through an input device interface 78 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like.

The computing device 12 also includes a communication interface 80 suitable for communicating with the network 16 as appropriate or desired. The computing device 12 may also include a video port 82 configured to interface with a display 84, to provide the operator or user information during the examples disclosed herein.

Figure 6:
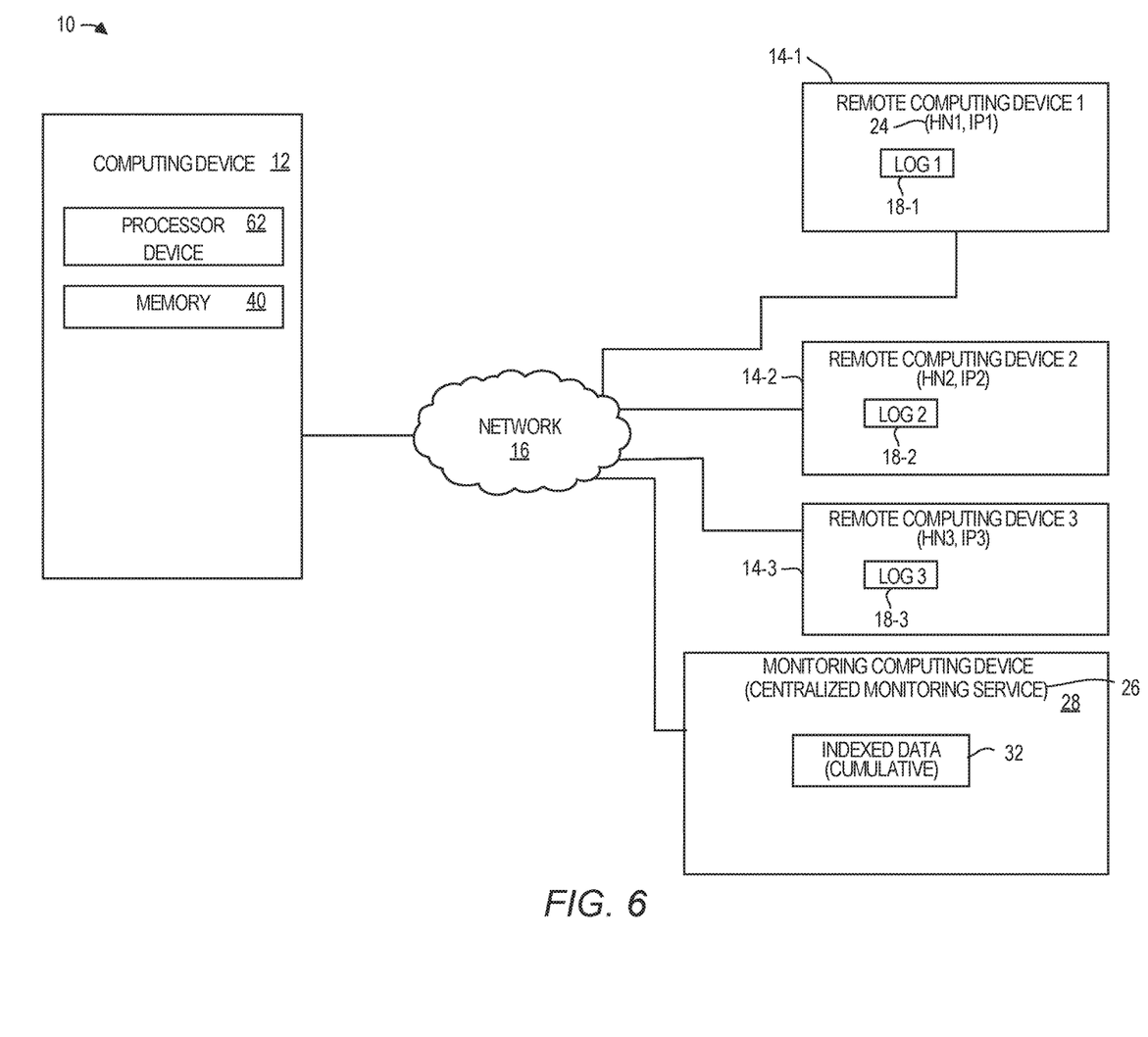
FIG. 6 is a block diagram of a simplified version of the system illustrated in FIG. 1 according to one example.

FIG. 6 is a block diagram of a simplified version of the system 10 illustrated in FIG. 1, according to one example. The system 10 includes the computing device 12 and the plurality of remote computing devices 14. The computing device 12 includes the memory 40 and the processor device 62 coupled to the memory 40. The processor device 62 establishes connections with the plurality of remote computing devices 14. Each remote computing device 14 has a corresponding logfile 18. For a plurality of iterations, the processor device 62 retrieves logfile contents from each logfile 18 on each remote computing device 14, and sends the logfile contents to the centralized monitoring service 26.

Individuals will recognize improvements and modifications to the examples of the disclosure. All such improvements and modifications are considered within the scope of the concepts disclosed herein and the claims that follow.

What is claimed is:

1. A method for consolidating logfile contents from remote computing devices, comprising:
    establishing, by a computing device comprising a processor device via a network, connections with a plurality of remote computing devices, each remote computing device having a corresponding logfile;
    for a plurality of iterations, by the computing device via the network:
        for each remote computing device:
            retrieving logfile meta data from the remote computing device that is maintained by the remote computing device and that identifies a plurality of attributes of the corresponding logfile, at least one of the attributes being an attribute that changes upon a write action being performed against the corresponding logfile;
            determining that the logfile meta data indicates a change to the logfile meta data since a previous iteration;
            storing, by the computing device, the logfile meta data in a memory;
            based on the logfile meta data, retrieving only logfile contents from the corresponding logfile that were not previously retrieved, by:
                determining from the logfile meta data that the corresponding logfile has a new logfile status or an old logfile status;
                if the corresponding logfile has the new logfile status, retrieving all the logfile contents of the corresponding logfile; and
                if the corresponding logfile has the old logfile status, retrieving the logfile contents of the corresponding logfile that have been added to the corresponding logfile since the corresponding logfile was previously accessed; and
            sending the logfile contents to a centralized monitoring service.

2. The method of claim 1 wherein retrieving all the logfile contents further comprises determining a total number of lines of the corresponding logfile and storing the total number of lines in the memory.

3. The method of claim 2 wherein retrieving the logfile contents of the corresponding logfile that have been added to the corresponding logfile since the corresponding logfile was previously accessed comprises:
    retrieving a previous total number of lines in the corresponding logfile from the memory;
    determining a current total number of lines in the corresponding logfile;
    determining a number of new lines in the corresponding logfile based on the previous total number of lines in the corresponding logfile and the current total number of lines in the corresponding logfile; and
    retrieving a number of most recent lines written to the corresponding logfile equal to the number of new lines.

4. The method of claim 1 wherein the logfile meta data comprises inode data.

5. The method of claim 4 wherein storing the logfile meta data in the memory comprises:
    storing, for each corresponding logfile, a first inode identifier that identifies an inode at a time T1 that refers to the respective corresponding logfile;
    and wherein determining from the logfile meta data that the corresponding logfile has the new logfile status or the old logfile status comprises:
        determining a second inode value that identifies the inode at a time T2 that refers to the respective corresponding logfile; and
        responsive to determining that the second inode value is different from the first inode value, determining that the corresponding logfile has the new logfile status.

6. The method of claim 4 wherein storing the logfile meta data in the memory comprises:
    storing, for each corresponding logfile, a first inode value that identifies an inode at a time T1 that refers to the respective corresponding logfile;
    storing, for each corresponding logfile, a first modification timestamp that identifies a most recent modification time of the respective corresponding logfile;
    and wherein determining from the logfile meta data that the corresponding logfile has the has the new logfile status or the old logfile status comprises:
        determining a second inode value that identifies the inode at a time T2 that refers to the respective corresponding logfile; and
        responsive to determining that the second inode value is the same as the first inode value, determining that the corresponding logfile has the new logfile status;
        responsive to determining that the corresponding logfile status has the new logfile status, determining a second modification timestamp that identifies the most recent modification time of the respective corresponding logfile; and
        responsive to determining that the second modification timestamp is different from the first modification timestamp, retrieving the logfile contents of the corresponding logfile that have been added to the corresponding logfile since the corresponding logfile was previously accessed.

7. The method of claim 1 wherein storing the logfile meta data in the memory comprises:
    storing, for each corresponding logfile, a first creation time value that uniquely identifies a first creation time of the respective corresponding logfile;
    and wherein determining from the logfile meta data that the corresponding logfile has the new logfile status or the old logfile status comprises:
        determining a second creation time value that uniquely identifies a second creation time of the respective logfile; and responsive to determining that the second creation time value is different from the first creation time value, determining that the corresponding logfile has the new logfile status.

8. The method of claim 1 further comprising waiting a predetermined amount of time, and after the predetermined amount of time, performing another iteration of the plurality of iterations.

9. The method of claim 1 wherein establishing the connections with the plurality of remote computing devices comprises establishing secure connections with the plurality of remote computing devices.

10. The method of claim 9 wherein establishing the secure connections with the plurality of remote computing devices comprises obtaining, for each remote computing device of the plurality of remote computing devices, a public key associated with the remote computing device, and establishing the secure connections with the plurality of remote computing devices using the public key associated with each respective remote computing device.

11. The method of claim 1 wherein retrieving all the logfile contents further comprises determining a total size of the corresponding logfile and storing the total size of the corresponding logfile in the memory.

12. The method of claim 11 wherein retrieving the logfile contents of the corresponding logfile that have been added to the corresponding logfile since the corresponding logfile was previously accessed comprises:
retrieving a previous size of the corresponding logfile from the memory;
determining a current size of the corresponding logfile;
determining a new amount of data based on the previous size and the current size; and
retrieving a most recent amount of data added to the corresponding logfile equal to the new amount of data.

13. A computing device comprising:
a memory;
a processor device coupled to the memory to:
establish a corresponding secure shell (SSH) connection to each of a plurality of remote computing devices, each remote computing device having a corresponding logfile; and
for a plurality of iterations for each remote computing device:
retrieve, via the corresponding SSH connection, logfile meta data from the remote computing device that is maintained by the remote computing device and that identifies a plurality of attributes of the corresponding logfile, at least one of the attributes being an attribute that changes upon a write action being performed against the corresponding logfile;
determine that the logfile meta data indicates a change to the logfile meta data since a previous iteration;
store the logfile meta data in the memory;
based on the logfile meta data, retrieve, via the corresponding SSH connection, only logfile contents from the corresponding logfile that were not previously retrieved; and
send the logfile contents to a centralized monitoring service.

14. The computing device of claim 13 wherein to retrieve only the logfile contents from the corresponding logfile that were not previously retrieved, the processor device is further to:
determine from the logfile meta data that the corresponding logfile has a new logfile status or an old logfile status;
if the corresponding logfile has the new logfile status, retrieve all the logfile contents of the corresponding logfile; and
if the corresponding logfile has the old logfile status, retrieve the logfile contents of the corresponding logfile that have been added to the corresponding logfile since the corresponding logfile was previously accessed.

15. The computing device of claim 14 wherein to retrieve all the logfile contents the processor device is further to determine a total number of lines of the corresponding logfile, and store the total number of lines in the memory.

16. The computing device of claim 15 wherein to retrieve the logfile contents of the corresponding logfile that have been added to the corresponding logfile since the corresponding logfile was previously accessed the processor device is further to:
retrieve a previous total number of lines in the corresponding logfile from the memory;
determine a current total number of lines in the corresponding logfile;
determine a number of new lines in the corresponding logfile based on the previous total number of lines in the corresponding logfile and the current total number of lines in the corresponding logfile; and
retrieve a number of most recent lines written to the corresponding logfile equal to the number of new lines.

17. A computer program product for consolidating log information from remote computing devices, the computer program product stored on a non-transitory computer-readable storage medium and including instructions to cause a processor device to carry out steps of:
establishing connections with a plurality of remote computing devices, each remote computing device having a corresponding logfile; and
for a plurality of iterations, by a computing device via the network:
for each remote computing device:
retrieving logfile meta data from the remote computing device that is maintained by the remote computing device and that identifies a plurality of attributes of the corresponding logfile, the logfile meta data comprising inode data that corresponds to the corresponding logfile, at least one of the attributes being an attribute that changes upon a write action being performed against the corresponding logfile;
determining that the logfile meta data indicates a change to the logfile meta data since a previous iteration;
storing, by the computing device, the logfile meta data in a memory;
based on the logfile meta data, retrieving only the logfile contents from the logfile that were not previously retrieved; and
sending the logfile contents to a centralized monitoring service.

18. The computer program product of claim 17 wherein, for the plurality of iterations, retrieving only the logfile contents from the corresponding logfile that were not previously retrieved further comprises steps of:
determining from the logfile meta data that the corresponding logfile has a new logfile status or an old logfile status;

if the corresponding logfile has the new logfile status, retrieving all the logfile contents of the corresponding logfile; and if the corresponding logfile has the old logfile status, retrieving the logfile contents of the corresponding logfile that have been added to the corresponding logfile since the corresponding logfile was previously accessed.

19. The computer program product of claim 18 wherein retrieving all the logfile contents further comprises steps of determining a total number of lines of the corresponding logfile, and storing the total number of lines in the memory.

20. The computer program product of claim 19 wherein retrieving the logfile contents of the corresponding logfile that have been added to the corresponding logfile since the corresponding logfile was previously accessed further comprises steps of:

retrieving a previous total number of lines in the corresponding logfile from the memory;

determining a current total number of lines in the corresponding logfile;

determining a number of new lines in the corresponding logfile based on the previous total number of lines in the corresponding logfile and the current total number of lines in the corresponding logfile; and retrieving a number of most recent lines written to the corresponding logfile equal to the number of new lines.

\* \* \* \* \*